No. 764,213. PATENTED JULY 5, 1904.
C. P. STEINMETZ.
SYSTEM OF ELECTRICAL DISTRIBUTION.
APPLICATION FILED JAN. 23, 1895.

NO MODEL. 3 SHEETS—SHEET 1.

WITNESSES.
A. F. Macdonald.
B. B. Hull.

INVENTOR—
Charles P. Steinmetz
By Geo. R. Blodgett
Atty

No. 764,213. PATENTED JULY 5, 1904.
C. P. STEINMETZ.
SYSTEM OF ELECTRICAL DISTRIBUTION.
APPLICATION FILED JAN. 23, 1895.
NO MODEL. 3 SHEETS—SHEET 2.
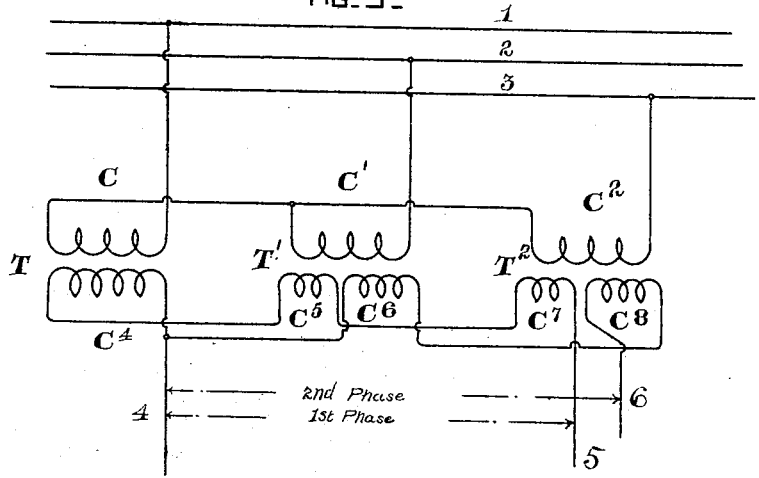
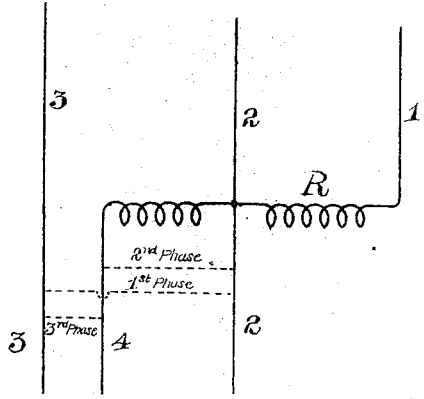
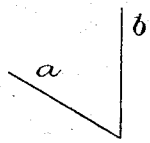
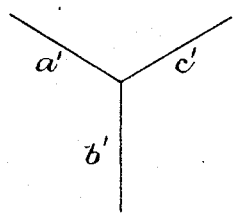
WITNESSES
A. F. Macdonald
B. B. Hull.
INVENTOR
Charles P. Steinmetz
By Geo. R Blodgett
Atty.

No. 764,213. PATENTED JULY 5, 1904.
C. P. STEINMETZ.
SYSTEM OF ELECTRICAL DISTRIBUTION.
APPLICATION FILED JAN. 23, 1895.
NO MODEL. 3 SHEETS—SHEET 3.

WITNESSES—
A. F. Macdonald.
B. B. Hull.

INVENTOR—
Charles P. Steinmetz
By G. R. Blodgett
Atty.

No. 764,213. Patented July 5, 1904.

UNITED STATES PATENT OFFICE.

CHARLES P. STEINMETZ, OF SCHENECTADY, NEW YORK, ASSIGNOR TO THE GENERAL ELECTRIC COMPANY, A CORPORATION OF NEW YORK.

SYSTEM OF ELECTRICAL DISTRIBUTION.

SPECIFICATION forming part of Letters Patent No. 764,213, dated July 5, 1904.

Application filed January 23, 1895. Serial No. 535,901. (No model.)

*To all whom it may concern:*

Be it known that I, CHARLES P. STEINMETZ, a subject of the Emperor of Germany, residing at Schenectady, county of Schenectady, State of New York, have invented certain new and useful Improvements in Systems of Electrical Distribution, of which the following is a specification.

The present invention relates to a novel method and certain novel means for transforming an alternating-current system comprising polyphase electromotive forces of any given number and phase relation into a different system where the phase relation of the electromotive forces corresponds to that desired. There is an almost endless variety of phase transformations rendered practicable by the invention; but in the present state of the art, where two-phase and three-phase translating devices are the ones most commonly employed, the transformation from quarter-phase to three phase, or vice versa, presents the greatest practical importance, and I will therefore explain the invention in connection with the transformation of either one of the systems mentioned into the other, though without intending to limit the invention in any wise to systems of this character, since, as will be evident from the description hereinafter, electromotive forces having any given phase relation may be converted into electromotive forces with any desired different phase relation.

In explaining the invention it will be helpful to consider the subject from a mathematical standpoint to an extent sufficient to make clear the analogy between the mode of practicing the invention and the well-known laws of the parallelogram of forces. Reference is therefore made to the drawings, wherein—

Figure 1:
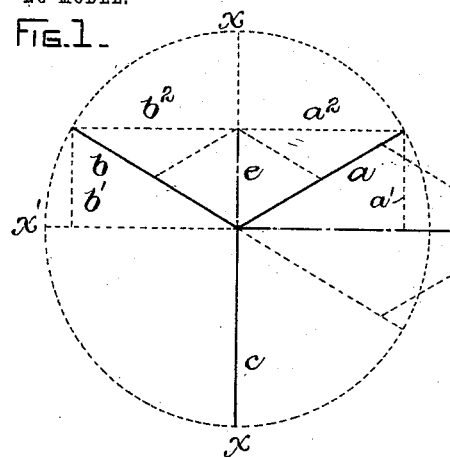
Figure 2:
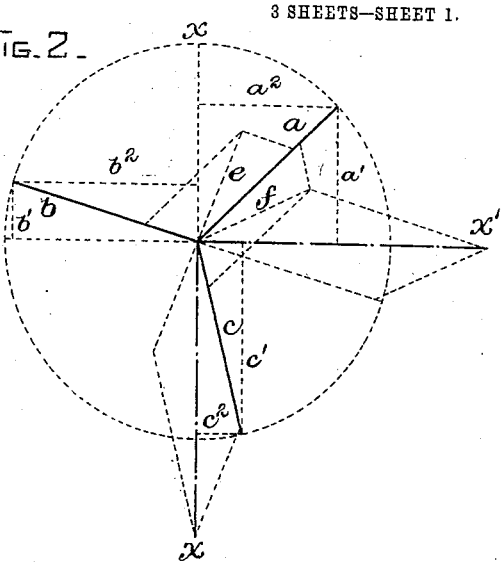
Figure 3:
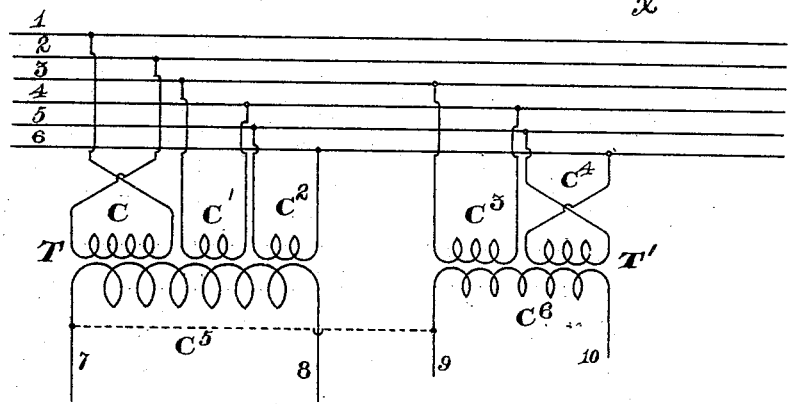
Figure 4:
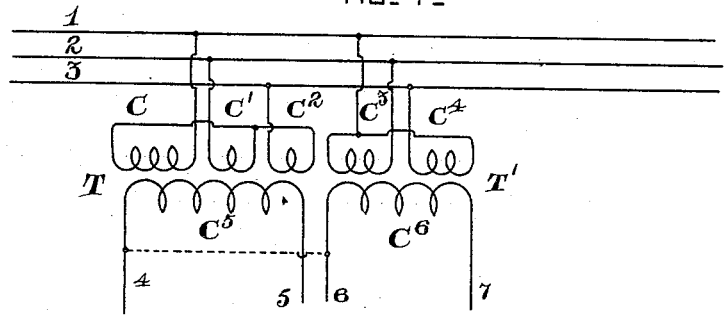
Figure 6:
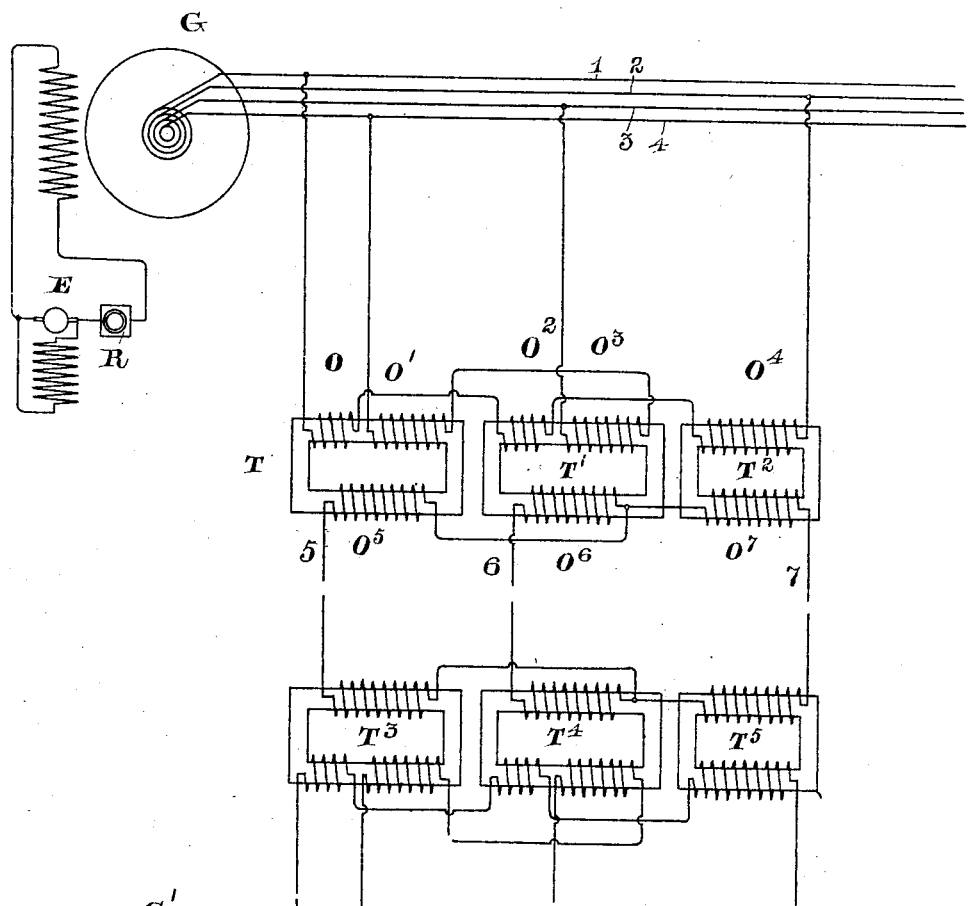
Figure 7:
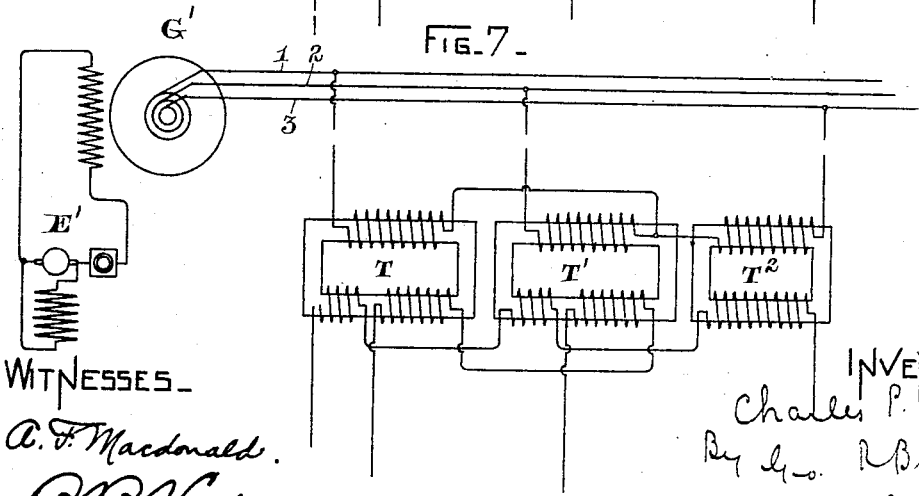

Figures 1 and 2 are diagrams illustrating the conversion of three forces one hundred and twenty degrees apart into two forces ninety degrees apart, or vice versa. Figs. 3, 4, and 5 are diagrams illustrating different ways in which the electromotive forces to be transformed may be combined so as to secure the new phases desired. Figs. 6, 7, and 8 are diagrams of distribution systems, illustrating typical embodiments of the invention; and Fig. 9 contains diagrams illustrative of the distribution system of Fig. 8.

I will first assume that a three-phase system of distribution is to be changed into a quarter-phase system and will describe some of the ways in which this may be accomplished.

Let $a\ b\ c$, Fig. 1, represent the three electromotive forces of such a system displaced one hundred and twenty degrees in phase and of equal voltage and further assume that it is desired to transform these electromotive forces into other forces corresponding in angular relation to the vertical and horizontal lines $x\ x,\ x'\ x'$. On the diagram the vertical and horizontal vectors $a'\ a^2\ b'\ b^2$ are drawn, into which the forces $a\ b$, respectively, may be resolved, while $c$ may in like manner be regarded as the resultant or equivalent of a vertical vector equal in length to the line $c$ and a zero horizontal vector. Now combine the forces $a\ b\ c$ in values and directions corresponding to the vertical vectors and the resultant will be found to be an electromotive force in the direction of $x\ x$. To represent this, there are laid off on lines $a\ b$ lengths equal, respectively, to $a'\ b'$, and by completing the parallelogram a resultant $e$ is secured. When $e$ and $c$ are then combined, after reversing one of them—for example, $c$—to correspond with the different directions of the vectors $a',\ b'$, and $c$ a resultant electromotive force is obtained in the direction of line $x\ x$ equal in value to the sum of $e$ and $c$. This is one of the electromotive forces of the required quarter-phase system and, as already pointed out, has been secured by combining the forces in values and directions proportional to the vertical vectors. To secure the second electromotive force of the desired quarter-phase system, lay off on line $a\ a$ a length equal in value to the horizontal component $a^2$ and lead off on $b$ when reversed (since it will be observed that the vectors $a^2\ b^2$ are in opposite directions) a length equal to $b^2$. By completing this parallelogram, as shown in the figure, a second resultant is secured in the direction of line $x'\,x'$ of equal value to the resultant in the direction of line $x\,x$ and at right angles therewith. From this it will be clear that the initial forces have been combined in a manner corresponding, respectively, to the vertical and horizontal vectors given by the parallelogram of forces drawn to represent the transformation desired, the result being two electromotive forces having the required phase difference.

Fig. 2 is a second diagram, representing exactly the same method of phase transformation and differing only from Fig. 1 in showing each of the three initial electromotive forces resolved into components instead of two only, as before. In other words, in Fig. 2 neither of the original phases are assumed to correspond in direction with either of the required new phases. Let the problem, Fig. 2, be to change the three phases represented by lines $a\,b\,c$ into two phases in the direction of lines $x\,x,\,x'\,x'$. Draw, as before, the vertical and horizontal vectors $a'\,a^2\,b'\,b^2\,c'\,c^2$. Then by combining $a$ and $b$ in values proportional to $a'$ and $b'$ a resultant $e$ is secured. Reversing $e$ and combining it with a value of $c$ equal to vector $c'$ a resultant is secured which, as shown in the figure, corresponds in direction with the line $x\,x$. So, in like manner, by combining values of $a$ and $c$ proportional to the horizontal vectors $a^2\,c^2$ a resultant $f$ is secured. Then by reversing $b$, since the vector $b^2$ is in the opposite direction to $a^2$ and $c^2$, and combining resultant $f$ with a value of $b$ equal to $b^2$ a final resultant is secured, as indicated, in the direction of line $x'\,x'$. The mode of procedure, it will be seen, is the same as in Fig. 1, except that it becomes a little more complicated, because the angle of all the initial phases is to be changed.

In practicing the invention I prefer to use transformers or compensators for combining the electromotive forces in the manner pointed out, since the turns of the transformer-windings can readily be proportioned so as to secure electromotive forces of the different phases having the necessary relative values, and the directions of the transformer-windings can be reversed when necessary, so that the electromotive forces combined may correspond not only in value, but in direction, with the vectors in the parallelogram. In many cases, however, other forms of apparatus may be employed. One suitable arrangement of transformers is shown in Fig. 3 for effecting the phase transformation corresponding to Fig. 1. The mains of a six-wire three-phase system having independent circuits are represented by 1 2 3 4 5 6, of which 1 2 constitute one circuit 3 4, a second circuit, and 5 6 the third circuit. T T' are two transformers with independent magnetic circuits. Transformer T has three primary coils C C' $C^2$, whose turns are proportioned so as to correspond, respectively, with the lines $c\,a'\,b'$, Fig. 1. The coil C is reversed relatively to the other two in order that its electromotive force and the resultant of that due to coils C' $C^2$ may act in the same direction. The reason for this reversal will be apparent from what has already been said in connection with the diagram Fig. 1. The three coils are coupled to the circuit-mains, as shown in the diagram, so that each receives an electromotive force displaced one hundred and twenty degrees from either of the others. $C^5$ is the secondary coil of the transformer, connected to mains 7 and 8, forming one branch of a quarter-phase system. Transformer T' has two primary coils $C^3\,C^4$, whose turns are proportioned to correspond with lines $a^2\,b^2$, Fig. 1, and coil $C^4$ is reversed in direction. Coil $C^3$ is connected to the same branch of the circuit as coil C' of transformer T and coil $C^4$ to the same branch as coil $C^2$. The secondary coil $C^6$ of this transformer has its terminals connected to mains 9 10, forming the second branch of a quarter-phase system, or one terminal of the coil may be connected to the main 7, as indicated in dotted lines, in which case the main 9 is unnecessary, since 7 will serve as a common return. With this arrangement the conditions correspond with the diagram Fig. 1 in all respects. The three electromotive forces induced by the coils C C' $C^2$ correspond in value and direction with the vectors $c\,a'\,b'$, and hence when combined they will give rise to a resultant magnetization in the transformer-core, and consequently to a secondary electromotive force in coil $C^5$, represented in the diagram Fig. 1 by line $x\,x$. The electromotive forces induced by coils $C^3\,C^4$ similarly correspond in direction and value with the vectors $a^2\,b^2$, Fig. 1, and hence the magnetic phase and secondary electromotive force induced in the coil $C^6$ correspond to line $x'\,x'$, or, in other words, the electromotive forces in circuit 7 8 9 10 differ by ninety degrees. The primary and secondary windings will also be so proportioned in any given installation as to give the desired transformation of potential between the primary and secondary sides as well as the transformation of phase.

When the procedure thus explained is followed, the electromotive forces are combined in the transformers, the out-of-phase impressed electromotive forces establishing resultant magnetic phases in the cores of the transformers. The object desired may, however, equally well be accomplished in other ways, two of which are shown in Figs. 4 and 5.

In Fig. 4, 1 2 3 represent the mains of a three-wire interlinked three-phase system, and the transformers T T' are wound with primary and secondary coils proportioned as in Fig. 3, but differently connected in some respects. In this case the coils C C′ C² of transformer T have one set of terminals connected together, and their other terminals are joined, respectively, to the different mains. Connections are made so that the electromotive force in coil C is reversed, as in Fig. 3. Transformer T′ has two primary coils C³ C⁴, having one set of terminals connected together and to the main 1, while the other terminals are joined to the mains 2 3. These coils are also so arranged that the electromotive force in one of them is reversed. The terminals have secondary coils, (marked C⁵ C⁶,) which may be connected to mains 4 5 6 7, forming a four-wire two-phase system, or, as indicated in dotted lines, main 6 may be omitted and the corresponding terminal of coil C⁶ connected to main 4. In this case the impressed electromotive forces tend to combine in the primary coils, giving resultant electromotive forces ninety degrees displaced in phase, from which secondary electromotive forces of like phase are obtained.

In Fig. 5 the combination of electromotive forces takes place in the secondary circuits of the transformers. For this purpose three transformers T T′ T² are used, having primary coils C C′ C² connected to the three-phase mains 1 2 3, as shown in the diagram, in a manner well known in the art. Transformer T has a secondary winding C⁴, while each of the other transformers has two secondary coils (marked, respectively, C⁵ C⁶ C⁷ C⁸.) All of these coils are proportioned to correspond with the different vectors shown on the diagram Fig. 1. Coil C⁴ is reversed relatively to coils C⁵ C⁷ and is connected in series with them, the free terminals leading to mains 4 5. The coils C⁶ C⁸ are likewise connected in series, with one reversed, and lead to mains 4 6, the secondary mains forming a three-wire two-phase system. In this case secondary electromotive forces are induced in the different transformers having the three-phase relation. In circuit 4 5 these electromotive forces are combined in a manner corresponding with the vertical vectors $a'$ $b'$ $c$, Fig. 1, while in circuit 4 6 they are combined to correspond with the horizontal vectors $a^2$ $b^2$. Hence the electromotive forces in the secondary circuits will have the quarter-phase relation, as already explained. These three specifically different arrangements are designed to show that the combination of electromotive forces may be secured in the primary windings or in the secondary windings or in the magnetic circuits of the transformers. It is of course equally feasible and within the invention to effect the necessary combination partly in one of these ways and partly in other ways. For example, the primary windings may be so connected as to change the phases on the primary side of the transformers into a different order of magnetic phases in the transformer-cores, and the secondary windings may be so coupled that the secondary electromotive forces are again combined to form a system on the secondary side differing in phase relation from that on the primary side or from the magnetic phases in the transformers.

In describing the invention so far I have explained the transformation from three phase to quarter phase; but it will of course be understood that all the arrangements mentioned are reversible, so that the transformation may be from quarter phase to three phase without change in the proportioning or coupling of the transformer-windings, the only thing needful being to reverse the function of the coils, the primary windings in the one case becoming the secondary windings when transformation in the reverse order is desired.

In Fig. 6 there is illustrated a system of distribution embodying the invention in a form heretofore used by me. G is a quarter-phase generator of any ordinary type, having four collector-rings connected to mains 1 2 3 4 and maintaining electromotive forces between the mains 1 2 and 3 4 displaced ninety degrees. The field-coils of the generator are supplied with current in any ordinary manner—as, for example, by a shunt-wound direct-current exciter E, regulated by a rheostat R. T T′ T² are three transformers of any ordinary pattern having independent magnetic circuits. Transformer T is provided with two primary coils O O′. Transformer T′ has two similar coils O² O³ and transformer T² a single coil O⁴. The coils O, O², and O⁴ are connected in series across one of the branches of the quarter-phase system 1 2. The coils O′ O³ are similarly connected in series across the other branch of the system 3 4, and the coil O³ is reversed relatively to O′. All these coils are proportioned in accordance with the principles already explained, so as to correspond with the vectors of a three-phase system as determined by the parallelogram of forces. Each of the transformers has a secondary coil (marked, respectively, O⁵ O⁶ O⁷) connected, as shown, to three secondary mains 5 6 7, forming a three-phase circuit. It will be observed that one of these coils, O⁷, is reversed relatively to the other two. In practice I have used windings for the different transformers proportioned as follows: fifty turns for coils O⁴ O⁵ O⁶ O⁷, forty-three turns for coils O′ O³, and twenty-five turns for coils O O². This has resulted in giving three-phase electromotive forces on the secondary side of the transformers suitable for operating three-phase translating devices coupled to the mains 5 6 7 in any desired manner. In the same figure I have indicated that by reversing the arrangement a three-phase system can be converted into a quarter-phase system, so that we have here represented a quarter-phase system converted into a three-phase system and again reconverted into a quarter-phase system. This will enable motors of the two different types to be operated from the same system, or from a quarter-phase generating-plant three-phase motors may be operated, or, if desired, three phases may be used in the transmitting-mains and two phases at the generating-station and translating devices. The transformers for reconverting the three-phase system into a quarter-phase system are shown at $T^3$ $T^4$ $T^5$, and they are wound with primary and secondary coils corresponding exactly to the coils in the transformers T T' $T^2$, except that, of course, what were the primary coils in the first case are now made the secondary coils, and the secondary coils in the first instance are now made the primary.

In Fig. 7 is shown a three-phase generator of any ordinary description whose field is in the circuit of a direct-current exciter E', which maintains three-phase electromotive forces between the mains 1 2 3. Transformers T T' $T^2$ are used for converting such a system into a quarter-phase system wherever this is found desirable. Since the windings of these transformers and the manner of coupling the coils are exactly the same as already explained in connection with transformers $T^3$ $T^4$ $T^5$, Fig. 6, this arrangement will be sufficiently understood from the diagram without further specific description.

Fig. 8 shows another form of invention designed to illustrate the use of compensators and also to show that it is not essential for all of the original phases to be transformed or combined. In this figure it is assumed that electromotive forces are maintained between the mains 1 2 and 2 3 sixty degrees displaced in phase—as, for example, by connecting the mains to what is known as a "monocyclic" generator. A compensating coil R has one terminal connected to main 1, while its other terminal leads to the main 4, forming the secondary or transformer system, together with the mains 3 and 2. The main 2 is connected to a central point in the compensator-coil.

In Fig. 9, $a$ $b$ show the relation of the electromotive forces between mains 1 2, 2 3. One of these phases—namely, that between mains 2 3—remains unchanged, as shown at $a'$ in the second diagram Fig. 9. The second one of the original phases is transformed as shown at $b'$ in the second diagram, so that we have electromotive forces between mains 3 2 and 2 4 one hundred and twenty degrees displaced, while the third phase between the mains 3 4 is the result of the first phase and the transformed second phase and, as illustrated at $c'$, Fig. 9, is one hundred and twenty degrees displaced from the others.

Many other arrangements will readily suggest themselves to engineers skilled in the art by which any desired phase transformation may be accomplished in accordance with the principles of the invention, which it is deemed unnecessary to explain.

What I claim as new, and desire to secure by Letters Patent of the United States, is—

1. The method which consists in generating two-phase currents, producing thereby magnetomotive forces, combining said magnetomotive forces so as to produce a plurality of resultant magnetomotive forces, and deriving three-phase fluxes as the result of said combination.

2. The method of phase transformation which consists in generating two-phase currents, combining component magnetomotive forces due to such two-phase currents, deriving three-phase fluxes as the result of such combination, and inducing three-phase electromotive forces by the action of said fluxes.

3. The method which consists in generating two-phase currents, combining component magnetomotive forces due to such two-phase currents, and deriving as the result of such combination two resultant magnetomotive forces, each differing by the same phase angle from one of the two-phase currents.

4. The method which consists in generating two-phase currents, combining magnetomotive forces due to such currents, deriving three-phase fluxes as the result of such combination, inducing three-phase currents by the action of said three-phase fluxes, transmitting said three-phase currents, and then transforming said three-phase currents.

5. The method which consists in generating magnetomotive forces of a given phase relation, deriving therefrom three-phase fluxes, deriving three-phase electromotive forces by the operation of such fluxes, and combining said electromotive forces in proper relations to produce resultant quarter-phase electromotive forces.

6. The method of transforming a polyphase current of a given number of phases into a polyphase current of a different number of phases which consists in generating three-phase fluxes by the action of the current to be transformed, inducing electromotive forces by the action of said fluxes, and combining such electromotive forces to produce a polyphase system having the desired number of phases.

7. The method of interchangeably transforming two-phase and three-phase currents which consists in generating three dephased fluxes by the action of the currents to be transformed, producing thereby electromotive forces having the phase relation desired, and deriving from said electromotive forces currents having that phase relation into which it is desired that the original currents should be transformed.

8. The method of interchangeably transforming two-phase and three-phase currents which consists in generating component magnetomotive forces by the action of the currents to be transformed, combining such component magnetomotive forces to produce three resultant magnetomotive forces, and generating currents of the phase relation desired through the action of the fluxes produced by said resultant magnetomotive forces.

In witness whereof I have hereunto set my hand this 19th day of January, 1895.

CHARLES P. STEINMETZ.

Witnesses:
B. B. HULL,
A. F. MACDONALD.